3,347,837
PROCESS FOR ISOLATING CARBOXYLIC ACID-BEARING CHLOROPRENE POLYMERS
John Frederick Smith, Wilmington, Del., assignor to E. I. du Pont de Nemours and Company, Wilmington, Del., a corporation of Delaware
No Drawing. Filed Nov. 17, 1964, Ser. No. 411,729
7 Claims. (Cl. 260—87.5)

This application is a continuation-in-part of my co-pending application Ser. No. 336,378, filed Jan. 8, 1964, now abandoned. This invention relates to an improved process for isolating carboxylic acid-bearing chloroprene polymers from their latices and to the improved polymers obtained thereby.

Carboxylic acid-bearing chloroprene copolymers per se are well known (see U.S. Patent 2,066,331). They have been suggested for forming controlled high modulus elastomers in their isolated form. As isolated polymers and as latices, they have been suggested for use in adhesives. These carboxylated copolymers are usually formed by emulsion polymerization of chloroprene and an acid-bearing monomer in acid emulsions followed by steam distillation to remove unreacted chloroprene and isolation of the polymer from the monomer-free latex by freeze rolling or drum drying. When these operations are conducted on acidic emulsions, steam stripping leads to excessive formation of coagulum. The polymer isolated from acidic emulsions by freeze rolling is, moreover, subject to premature vulcanization or scorching when compounded with bivalent metal oxides such as zinc or magnesium oxide. It scorches so readily that its usefulness is limited. Further, contamination of isolated copolymer with unreacted vinyl compound, also occurs when the copolymer is isolated directly from the polymerization mass unless special steps such as ion exchange are taken to remove it prior to isolation.

It has now been shown that the process of isolation of carboxylic acid-bearing chloroprene copolymers, of which chloroprene/methacrylic acid copolymers are representative, can be improved by adjusting the pH of the acidic aqueous dispersions in which the copolymers have been prepared to between about 7 and 12 with aqueous solutions of an alkali metal hydroxide prior to removal of unreacted chloroprene by distillation.

Surprisingly, adjustment of pH prior to removal of monomer minimizes the amount of coagulum formed during processing of the latex before isolation. As additional benefits, the copolymers isolated by the improved process of this invention display a substantial reduction in scorchiness and contain less water-insoluble, carboxylic acid-bearing monomers.

The copolymer latices to which the present process is applicable may be prepared by essentially standard procedures for emulsion polymerization. The following general procedure has been found effective for preparing latices from which carboxylated copolymer may be isolated. This procedure is especially preferred for preparing aqueous dispersions of copolymers of chloroprene and methacrylic acid.

A solution of chloroprene and a monomer of the formula

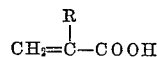

where R is hydrogen or $C_1$ to $C_4$ alkyl, the solution containing less than 5% by weight of carboxyl groups based on the weight of the solution, is emulsified in water by using surfactants such as organic sulfonates or sulfates. The concentration of vinyl monomer determines the approximate concentration of acid groups in the final copolymer which will generally be at least 0.02 percent by weight.

A modifying agent or chain transfer agent should be included in the emulsion to control the molecular weight and viscosity of the copolymer. As known by those skilled in the art, increasing amounts of a given modifier lower molecular weight and viscosity. Examples of suitable modifying agents are aliphatic mercaptans having 4 to 18 carbon atoms and dialkyl xanthogen disulfides in which alkyl groups have 1 to 8 carbon atoms. Polymerization is brought about by the addition of a redox catalyst, examples of which are potassium persulfate in combination with sodium sulfite, hydrogen peroxide with sodium hydrosulfite, and potassium ferricyanide with sodium sulfite. The catalyst components should be added in such a way as to give a controllable polymerization. The polymerization usually is conducted at temperatures which may range from 0° C. to 60° C., with temperatures around 40° C. preferred. The reaction should be allowed to proceed to a high conversion of monomer to polymer in order to incorporate as much as possible of the less reactive acidic monomer. Thus, conversions of at least 70%, and preferably around 90%, are recommended. The progress of the polymerization may be followed by changes in the specific gravity of the reaction mass. When the desired conversion has been reached, polymerization may be stopped by the addition of substances such as phenothiazine, p-tert-butylpyrocatechol and di-tert-butylhydroquinone.

The aqueous dispersion of the copolymer produced by the procedures given above is acidic and exhibits pH values of about 2 to 3 depending on the specific ingredients and the amounts employed in the polymerization. If isolation of the copolymer is performed directly on the acidic dispersion by conventional procedures, the quantity of coagulum encountered leads to serious difficulties as indicated hereinbefore. Also, the product so produced is contaminated with any unreacted vinyl monomer. The isolated polymer processes poorly because of its scorchy nature in the presence of bivalent metal oxides normally employed in compounding.

Neutralization with ammonia solution or water-soluble organic amines is only slightly effective in reducing the amount of coagulum formed during polymer isolation. However, even though these reagents permit a minor reduction in coagulum, the isolated copolymers readily scorch during processing. This inferiority of copolymers isolated after neutralization with an ammonia or amines relative to copolymers isolated by the process of this invention will be brought out in the examples which appear hereinafter.

Surprisingly, it has been found that the aqueous dispersions of carboxylated copolymers may be adjusted to a basic pH between 7 to 12 with relatively dilute aqueous solutions of alkali metal hydroxides without forming coagulum during the pH adjustment and further, that coagulum formation is minimized during unreacted monomer removal by distillation and subsequent isolation steps following the pH adjustment. The copolymers isolated by this improved procedure possess acceptable processability.

Any alkali metal hydroxide may be employed in the form of its aqueous solution for pH adjustment. This includes hydroxides of the elements in Group I-A of the Periodic Table. For reasons of economy, sodium and potassium hydroxides are preferred, with sodium hydroxide being especially preferred.

The concentration of the hydroxide solution employed for pH adjustment is important. The maximum concentration which does not lead to coagulation as the hydroxide solution is introduced into the copolymer dispersion is preferred since reduction of the copolymer concentration in the dispersion is undesirable. The maximum concentration of hydroxide which may be employed varies somewhat with different copolymer latices and with the particular metal hydroxide employed. In the case of dispersions in which the copolymer of chloroprene contains around 0.1–1% methacrylic acid, about 2% aqueous sodium hydroxide has been found useful for adjusting the pH. Sodium hydroxide concentrations greater than about 2.5% tend to form coagulum at the point of introduction to the dispersion unless additional soap is added to the caustic solution to improve the colloidal stability at the point of mixing. Concentrations below 2% may be used, but as previously indicated, this results in needless dilution of the latex.

Introduction of the aqueous hydroxide to the copolymer latex should be performed slowly while the dispersion is being agitated uniformly. This prevents a local increase in hydroxide concentration which might lead to coagulation at that point. The course of the pH adjustment may be followed by means of a pH meter or by indicator papers.

The pH adjustment may be accomplished at temperatures ranging from about 0° C. to 60° C. Obviously, adjustment either at ambient temperatures or at the temperature existing at the end of the polmyerization is most convenient. The amount of heat generated during the neutralization is usually insufficient to require cooling.

Prior to pH adjustment, the copolymer in the dispersion is believed to be present in the acid form; that is, the carboxyl groups are present as —COOH groups. Adjustment of pH is believed to convert a portion of these carboxyl groups to carboxylate salt groups which may be represented as —COO$^-$Me$^+$, wherein Me represents the alkali metal. The greater the pH of the dispersion, the greater the proportion of acid groups converted to salt groups.

In order to take advantage of the improved process of this invention, the pH must be adjusted to between 7 and 12; however, basicities between about pH 8 to pH 9 are preferred. At pH values below 7, coagulation is encountered to a serious degree. By operating at pH values in the preferred range of 8 to 9, there is a sufficient margin of safety to prevent accidental changes in pH which might shift the dispersion to the acid side. Operation at pH values above 9 up to 12 is satisfactory in regard to coagulation but in general is not preferred because a greater quantity of hydroxide solution is required which in turn results in unnecessary dilution of the copolymer dispersion. Above pH values of 12, the amount of hydroxide solution required becomes impractical.

After completion of the pH adjustment, isolation of the copolymer from its aqueous dispersion may be accomplished by conventional means. This involves removal of unreacted chloroprene by distillation or preferably by steam-stripping as disclosed in U.S. 2,467,769. The polymer contained in the stripped dispersion may then be isolated by coagulation effected by freezing as disclosed in U.S. 2,187,146. Alternatively, the copolymer may be isolated by drum drying the dispersion.

Copolymers isolated by the improved process of the present invention may be used in many applications in place of conventional chloroprene polymers. They are, however, most useful for the preparation of solvent adhesives exhibiting good storage stability and capable of producing bonds having outstanding high temperature cohesive strengths.

The invention will now be described with reference to the following examples of specific embodiments thereof wherein parts and percentages are by weight unless otherwise specified.

EXAMPLE 1

This example represents the use of the teachings of this invention to isolate four different chloroprene/methacrylic acid copolymers prepared at varying temperatures and varying degrees of polymer conversion. The experiments 1A, 1C, 1E, and 1G are within the scope of the invention; for purposes of comparison only, four experiments 1B, 1D, 1F, and 1H are described which correspond to the other four but are outside the scope of the invention since ammonia is employed instead of the alkali metal hydroxide.

Copolymers 1A and 1B

A copolymer of chloroprene and methacrylic acid is prepared from an emulsion having the following composition:

|  | Weight, grams |
|---|---|
| Chloroprene | 13,500 |
| Methacrylic acid | 180 |
| Diisopropyl xanthogen disulfide | 120 |
| Water | 18,067 |
| Amine salts of alkylated benzene-sulfonic acids | 176 |
| Sodium salt of formaldehyde-naphthalene-sulfonic acid condensate | 80 |

Polymerization is performed at 10–20° C. in a nitrogen atmosphere. The polymerization is catalyzed by adding 0.2 gram of 30% hydrogen peroxide followed by the addition of 0.05 gram portions of 1% sodium hydrosulfite solution. Addition of the sodium hydrosulfite solution is regulated to give the desired rate of polymerization. At about 77% conversion of monomers to copolymer, the polymerization is stopped by the addition of 70 grams of an emulsion having the following composition:

|  | Weight, grams |
|---|---|
| Water | 21.0 |
| Sodium lauryl sulfate, paste, 30% A.I. | 2.0 |
| Sodium salt of formaldehyde-naphthalene-sulfonic acid condensate | 0.7 |
| Benzene | 45.0 |
| Phenothiazine | 0.7 |
| p-Tertiary-butylpyrocatechol | 0.7 |

The resulting aqueous dispersion of copolymer is divided into two equal portions. To one of these, 2% aqueous sodium hydroxide solution is added slowly until the pH as indicated by a pH meter is 8. About 2200 milliliters of sodium hydroxide solution are required. The pH of the second portion is adjusted to 8 by the slow addition of 27% aqueous ammonia solution. About 200 milliliters are required. Unreacted chloroprene is removed from the two portions of copolymer latex by steam-stripping as described in U.S. 2,467,769 after which the copolymers are isolated by freeze coagulation in the form of a thin film as described in U.S. 2,187,146. The copolymer isolated after sodium hydroxide addition is within the scope of this invention and is designated as Copolymer 1A; that isolated after ammonia addition is outside the present invention and is designated as Copolymer 1B.

Copolymers 1C and 1D

The procedure for preparing Copolymers 1A and 1B is repeated with the exception that conversion of monomers to copolymer is allowed to go to 90% of completion prior to stopping the polymerization. Sodium hydroxide is employed for pH adjustment for Copolymer 1C; ammonia, for Copolymer 1D.

Copolymers 1E and 1F

The procedure for preparing Copolymers 1A and 1B is repeated with the exceptions that polymerization is carried out at 40° C. and the polymerization is stopped at a 70% conversion. Sodium hydroxide is employed for pH adjustment for Copolymer 1E; ammonia, for Copolymer 1F.

Copolymers 1G and 1H

The procedure for preparing Copolymers 1E and 1F is repeated with the exception that the polymerization is stopped at 89% conversion. Sodium hydroxide is employed for pH adjustment for Copolymer 1G; ammonia, for Copolymer 1H.

For each pair of copolymers isolated from a common polymerization, the amount of coagulum formed during steam-stripping of unreacted monomer is much greater in the case of the ammonia-neutralized portion than for the sodium hydroxide-neutralized portion as indicated by visual observation. The quantity of coagulum formed is sufficiently great in the case of the ammonia-neutralized latices to require frequent shut-downs due to pluggage of the stripping equipment with coagulum. Similar but worse plugging is obtained with acidic latices.

Scorch rate is determined on each of the above copolymers after compounding 100 parts of copolymer with 4 parts magnesium oxide, 5 parts zinc oxide and 2 parts of 2,2'-methylene-bis(4-ethyl-6-tertiary-butylphenol) on a conventional rubber mill. Scorch rate is determined by means of a Mooney viscometer. The information is recorded in Table I. In addition, polymerization temperature and conversion, neutralizing agent and the Mooney viscosity of the raw copolymer are included in Table I for convenience. Measurements of Mooney viscosity and scorch rate are determined in accordance with the procedures of ASTM D-1646-61.

divided into three equal portions. To one portion of each reaction mass, 2% aqueous sodium hydroxide is added until the pH is adjusted to 8. For the purposes of comparison only the adjustment of the pH to 8 is effected in the case of the other portions of each polymerization mass by the addition of diethanolamine (DEA) and triethanolamine (TEA) respectively; this is, of course, operation outside the scope of this invention. Following pH adjustment, all six copolymer latex samples are steam-stripped to remove unreacted chloroprene and isolated by freeze coagulation as described in Example 1.

TABLE II.—EFFECT OF NEUTRALIZING AGENT ON SCORCH RATE

| Polymerization | 2A | | | 2B | | |
|---|---|---|---|---|---|---|
| Neutralizing Agent | NaOH | DEA | TEA | NaOH | DEA | TEA |
| Mooney viscosity, ML 2½ (212° F.) | 29 | 31 | 29 | 50 | 41 | 42 |
| Mooney scorch, MS (250° F.): | | | | | | |
| Minimum, pts | 22 | 42 | 30 | 26 | 38 | 30 |
| 10 point rise, minutes | 13 | 9 | 6 | 20 | 9 | 4 |

The typical results indicated above clearly illustrate the improved scorch characteristics obtained for copolymers prepared by the process of the present invention, which employs sodium hydroxide for pH adjustment, relative to copolymers isolated after pH adjustment with organic amines.

TABLE I.—EFFECT OF NEUTRALIZING AGENT ON SCORCH RATE

| Copolymer | 1A | 1B | 1C | 1D | 1E | 1F | 1G | 1H |
|---|---|---|---|---|---|---|---|---|
| Polymer conversion | 77 | 77 | 90 | 90 | 70 | 70 | 89 | 89 |
| Polymerization temp. (° C.) | 10-20 | 10-20 | 10-20 | 10-20 | 40 | 40 | 40 | 40 |
| Neutralizing agent | NaOH | NH$_3$ | NaOH | NH$_3$ | NaOH | NH$_3$ | NaOH | NH$_3$ |
| Mooney viscosity, ML 2½ (212° F.) | 49 | 44 | 52 | 41 | 44 | 39 | 49 | 43 |
| Mooney scorch, MS (250° F.): | | | | | | | | |
| Minimum, value | 29 | 41 | 45 | 48 | 27 | 45 | 21 | 43 |
| 10 point rise, minute | 22 | 11 | 19 | 6 | 16 | 12 | 14 | 10 |

The typical scorch rate data in Table I indicate the superiority of sodium hydroxide for pH adjustment over ammonia for each pair of copolymers. This is surprising in that the Mooney viscosities of the raw polymers prepared with sodium hydroxide are higher than those prepared with ammonia. As known to those skilled in the art, an increase in scorch rate usually accompanies an increase in Mooney viscosity for closely related stocks.

EXAMPLE 2

Two copolymer latices are prepared by polymerization of emulsions having the following compositions:

| | Weight, gram | |
|---|---|---|
| | 2A | 2B |
| Chloroprene | 1,750 | 1,750 |
| Methacrylic acid | 23.3 | 23.3 |
| Diisopropyl xanthogen disulfide | 10 | |
| Dimethyl xanthogen disulfide | | 17.5 |
| Water | 2,054 | 2,054 |
| Amine salts of alkylated benzene sulfonic acids | 21 | 21 |
| Sodium salt of formaldehyde-naphthalene sulfonic acid condensate | 10.5 | 10.5 |

The polymerizations are carried out essentially by the procedure given in Example 1. Reagents not specified are employed in amounts proportional to those used in Example 1 relative to the amount of chloroprene. This includes the emulsion used to stop the polymerization. The polymerizations are, however, conducted at a temperature of 40° C. and allowed to proceed to a 92% conversion of monomers to copolymers prior to addition of the "short-stop" emulsion.

Following the polymerizations, each reaction mass is

EXAMPLE 3

An emulsion is prepared using the following recipe:

| | Parts |
|---|---|
| Chloroprene | 980 |
| Acrylic acid | 20 |
| Diisopropyl xanthogen disulfide | 9 |
| Triethanolammonium dodecylbenzene sulfonate (60% aqueous solution) | 20 |
| Sodium salt of formaldehyde-naphthalenesulfonic acid condensate | 6 |

The emulsion, maintained in a nitrogen atmosphere, is heated to 40° C. One part by weight of cumene hydroperoxide is added, and polymerization is then initiated by the addition of a solution containing 1 part of sodium hydrosulfite and 0.2 part of sodium hydroxide in 100 parts by volume of water. Polymerization is maintained by dropwise addition of this solution until the specific gravity of the emulsion is 1.075 (88% monomer conversion). In all, 24 parts by volume of the solution are required. Polymerization is arrested by addition of 15 parts of an emulsion containing the following ingredients:

| | Parts |
|---|---|
| Phenothiazine | 1 |
| p-Tert-butylpyrocatechol | 1 |
| Toluene | 64.2 |
| Water | 29.85 |
| Sodium lauryl sulfate | 2.84 |
| Sodium salt of formaldehyde-naphthalenesulfonic acid condensate | 1 |

The pH of the emulsion is adjusted to 8.0 by addition of an aqueous solution of 2% sodium hydroxide, and the excess chloroprene is removed by steam distillation. The polymer is recovered by freeze coagulation as described in U.S. Patent 2,187,146. It has a Mooney viscosity (ML 2.5, 212° F.) of 32.

Only traces of coagulum are observed during the removal of excess chloroprene. When the pH of the acidic emulsion is not adjusted before unreacted monomer is stripped, large amounts of coagulum are formed.

EXAMPLE 4

Two emulsions are prepared using the following recipes:

| | Parts | |
|---|---|---|
| | A | B |
| Chloroprene | 787 | 690 |
| 2,3-dichloro-1,3-butadiene | 200 | 290 |
| Methacrylic acid | 13 | 20 |
| Diisopropyl xanthogen disulfide | 9 | 9 |
| Water | 1,150 | 1,150 |
| Triethanolammonium dodecylbenzene-sulfonate (60% aqueous solution) | 20 | 20 |
| Sodium salt of formaldehydenaphthalene-sulfonic acid condensate | 6 | 6 |

Polymerization is performed at 40° C. in a nitrogen atmosphere. The polymerization is catalyzed as described in Example 3. Polymerization is continued until a specific gravity of 1.100 is reached (85% conversion). Polymerization is arrested as described in Example 1, and the pH is adjusted to 8 by the addition of 2% sodium hydroxide solution. Unreacted monomer is removed and the polymer is isolated by freeze coagulation as described in Example 1. In both systems only traces of coagulum are observed during the stripping of unreacted monomer. When stripping of the acidic emulsion without pH adjustment is attempted, such large amounts of coagulum are formed as to make the process impractical because of equipment pluggage and loss of polymer.

EXAMPLE 5

A terpolymer of chloroprene, acrylonitrile, and methacrylic acid is prepared as follows:

Two emulsions are prepared using the recipes shown below:

| | Parts | |
|---|---|---|
| | A | B |
| Acrylonitrile | 19.8 | |
| Chloroprene | 29.4 | 50 |
| Methacrylic acid | 0.8 | |
| Diisopropyl xanthogen disulfide | 0.3 | 0.55 |
| Water | 50 | 50 |
| Triethanolammonium dodecylbenzene-sulfonate (60% aqueous solution) | 1.2 | 1.1 |
| Sodium salt of formaldehydenaphthalene-sulfonic acid condensate | 0.5 | 0.5 |

Polymerization of Emulsion A is initiated and Emulsion B is continuously added to Emulsion A during the polymerization. The polymerization is carried out at 40° C. in a nitrogen atmosphere. Polymerization is initiated by adding several drops of 2% aqueous solution of potassium persulfate containing 0.1% sodium 2-anthraquinonesulfonate and several milliliters of the reducing component, which is a 0.5% aqueous solution of sodium hydrosulfite containing 0.2% sodium hydroxide. Polymerization is continued by dropwise addition of the reducing component. Conversion is carried to 80%. Polymerization is arrested by adding a stabilizer emulsion containing the following ingredients:

| | Parts |
|---|---|
| 2,6-di-tert-butyl-4-phenylphenol | 39.3 |
| Phenothiazine | 1.0 |
| 2,5-di-tert-butylhydroquinone | 1.0 |
| Toluene | 25.6 |
| Water | 30 |
| Sodium laurylsulfate | 2.8 |
| Sodium salt of formaldehyde-naphthalene-sulfonic acid condensate | 1.0 |

The stabilized emulsion is brought to a pH of 7-8 by addition of 2% aqueous sodium hydroxide and is then stripped of unreacted monomer. The polymer is isolated by freeze coagulation as described in U.S. Patent 2,187,146. The isolated polymer has a Mooney viscosity (ML 2.5, 212° F.) of 51. During stripping of the unreacted monomer, only traces of coagulum are observed. When the stripping is attempted without adjustment of pH, excessive amounts of coagulum are formed.

It is regarded as being within the scope of this invention to apply the improvement described to chloroprene copolymers wherein the methacrylic or acrylic acid monomer units are replaced by another vinyl monomer containing at least one carboxyl group and a carbon-to-carbon double bond activated by an adjacent carboxyl, ketocarbonyl or nitrile group. Representative vinyl monomers are compounds having the following general formulas:

(A) 

(B) 

(C) 

Compounds having general Formula A wherein R may be hydrogen, alkyl (e.g., methyl, ethyl, propyl, and butyl), aryl, cycloalkyl or arylalkyl include acrylic acid and its homologues. These compounds are preferred comonomers because they may be copolymerized with chloroprene with ease and they are readily available commercially. Within this class, acrylic acid and its lower alkyl substituted homologues are preferred, with methacrylic acid being especially preferred.

Compounds having general Formula B, wherein R' may be alkyl, aryl, cycloalkyl or arylalkyl and R" may be hydrogen, alkyl, aryl, cycloalkyl or arylalkyl, with the proviso that R' and R" bear a carboxyl group; and compounds having general formula C wherein R''' may be alkyl, aryl, cycloalkyl and arylalkyl, with the proviso that R''' bears a carboxyl group, may be used as vinyl monomers in preparing copolymers which may be isolated by the improved process of this invention. No monomers having these general formulas are available commercially at present.

As used herein, the term "carboxyl-containing chloroprene copolymers" includes those wherein part of the chloroprene, up to an equal amount by weight, may be replaced by at least one other monomer which does not contain a carboxyl group but which is copolymerizable with chloroprene. Suitable monomers include the following types: vinyl-substituted aromatic compounds such as styrene, vinyltoluenes, and vinylnaphthalenes; esters and nitriles of acrylic acid and methacrylic acid, such as methyl methacrylate and acrylonitrile; and compounds containing conjugated double bonds, such as 1,3-butadiene, isoprene, and 2,3-dichloro-1,3-butadiene. Likewise, the polymers may be prepared in the presence of sulfur or sulfur dioxide, in which case the copolymers will contain, respectively, polysulfide or sulfonyl linkages.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. In a process for isolating a

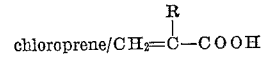

copolymer, wherein R is hydrogen or $C_1$ to $C_4$ alkyl, said copolymer prepared by polymerization in an acidic aqueous dispersion, the improvement comprising adjusting the pH value of said dispersion to between about 7 and 12 with an aqueous solution of an alkali metal hydroxide prior to removal of unreacted chloroprene by distillation.

2. A process as defined in claim 1 wherein said copolymer contains at least 0.02 weight percent acid groups.

3. A process as defined in claim 1 wherein said pH values range from about 8 to 9.

4. A process as defined in claim 1 wherein said aqueous solution contains less than about 2.5 weight percent alkali metal hydroxide.

5. In a process for isolating a copolymer of chloroprene containing about 0.1 to 1.0 weight percent methacrylic acid units, said copolymer prepared by polymerization in an acidic aqueous dispersion, the improvement comprising adjusting the pH value of said dispersion to between about 8 and 9 with an aqueous solution containing less than about 2.5 weight percent alkali metal hydroxide, prior to removal of unreacted chloroprene by distillation.

6. The scorch-resistant, carboxylic acid monomer-free

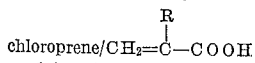

copolymer prepared by the improved process of claim 1.

7. The scorch-resistant, methacrylic acid monomer-free chloroprene/methacrylic acid copolymer prepared by the improved process of claim 5.

References Cited

UNITED STATES PATENTS

| | | | |
|---|---|---|---|
| 2,066,331 | 1/1937 | Carothers et al. | 260—92.3 |
| 2,187,146 | 1/1940 | Calcott et al. | 260—92.3 |
| 2,467,769 | 4/1949 | Morrow et al. | 203—80 |

JOSEPH L. SCHOFER, *Primary Examiner.*

D. K. DENENBERG, *Assistant Examiner.*